T. E. HUNT.
Cane Mill.
No. 23,287.
Patented March 15, 1859.
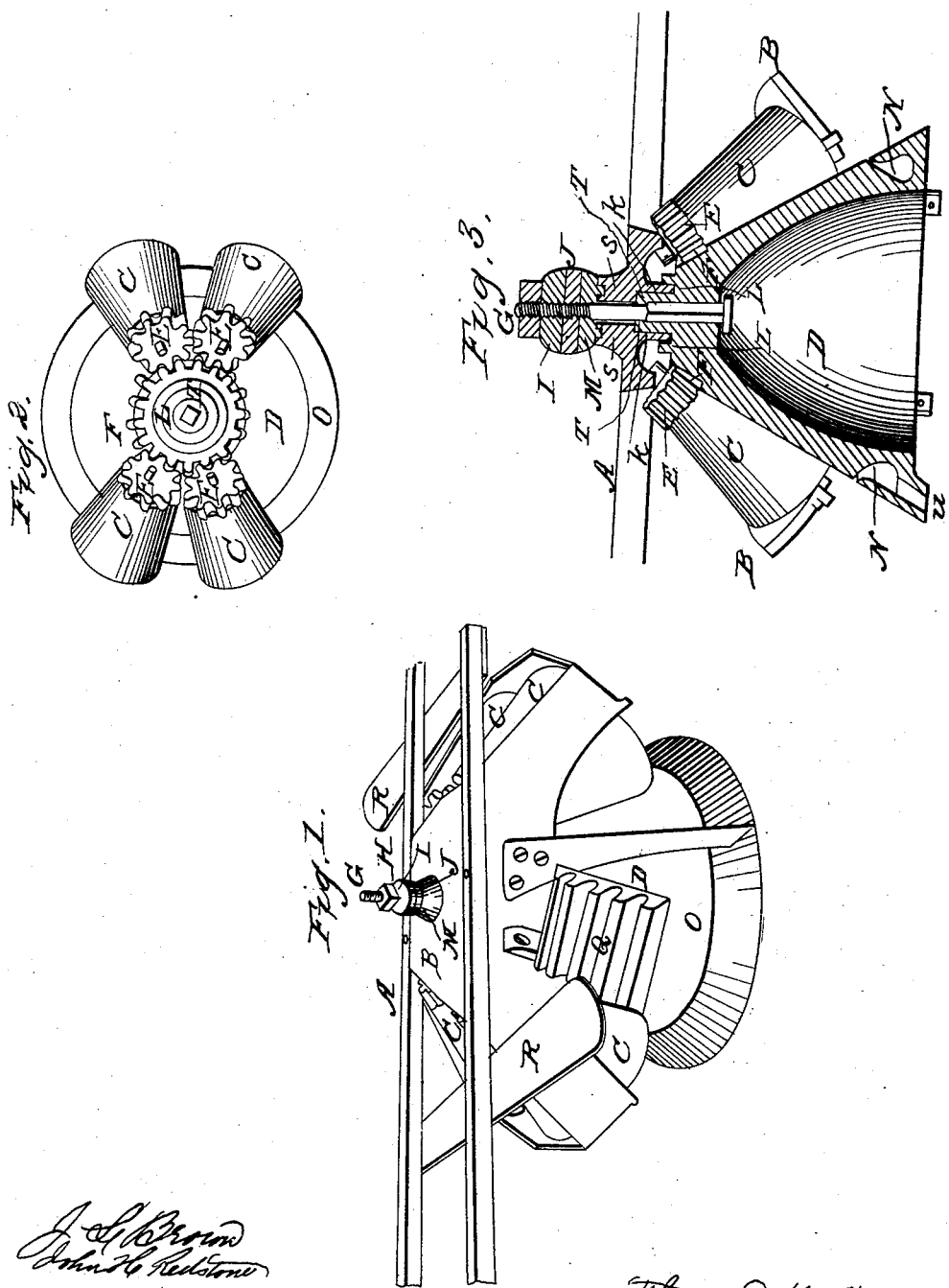

UNITED STATES PATENT OFFICE.

THOS. E. HUNT, OF INDIANAPOLIS, INDIANA, ASSIGNOR TO HIMSELF AND NATHAN T. HUNT, OF SAME PLACE.

IMPROVEMENT IN SUGAR-MILLS.

Specification forming part of Letters Patent No. 23,287, dated March 15, 1859.

*To all whom it may concern:*

Be it known that I, THOMAS E. HUNT, of Indianapolis, in the county of Marion and State of Indiana, have invented a new and useful Improvement in Sugar-Mills, of which the following is an exact description, reference being had to the accompanying drawings and the letters marked thereon.

Figure 1 is a perspective, and Figs. 2 and 3 are sectional, views showing the construction and general arrangement of the mill.

A is the lever-frame, attached to the frame B, which is constructed of iron, and in which the crushing-rollers C C C C operate. The rollers C C C C are cast with cogs upon the end, which gear with a series of cogs similarly constructed and arranged upon the cone D, which is also of iron, the trough N being cored out in casting, leaving the narrow opening O, which extends around the cone D below the bottom of the rollers, and through which the juice of the crushed cane may pass into the trough N, affording no hinderance to the free discharge of the cane (when crushed) from the cone D. The roller-frame B revolves upon the bolt G, which extends up through the top of the cone D and is held by the nut H. In the top of the roller-frame B is the groove or oil-cup S S, in which the flange upon the washer M operates. Between the washers M and I, and surrounding the bolt G, is the gum spring J, which is designed to give elasticity to the pressure or force effected by the bolt G and nut H upon the rollers C C C C. The flange K operates in the oil-cup L.

The advantages of this improvement may be seen by reference to the exact manner of its construction. The sides of the cone D rise at an angle of sixty degrees above the horizontal. The force being applied in a line with its axis causes the rollers C C C C to stand upon the side of the cone at an angle of thirty degrees from the line or direction in which the force is applied by the bolt G and nut H, thereby producing an increased pressure equal to the wedge or inclined plane of thirty degrees when the same are used for the purpose.

The following is the operation of the mill: The cane being fed into the same through the hopper Q, and in a similar manner on the opposite side of the mill, passes under the rollers C C C C as they revolve upon the cone D. The roller-frame B, running clear of the bolt G, has its bearing upon the hollow journal T, upon which the flange K slides up and down as the nut H or spring J are operated. The journal T is the fulcrum upon which the frame B operates in revolving the rollers C C C C. As the juice is expressed before the rollers, it passes down the cone D to the opening O, through which it enters the trough N, from which it is discharged at the spout U. The crushed cane from behind the rollers passes over the opening O, and is discharged or scraped from the cone D. A stick or any substance which the force designed to be used in crushing cane will not crush will, as the rollers pass over it, operate the spring J, as shown, thus preventing any injury to the mill. The cogs or gearing E E E E and F force the rollers C C C C to revolve, and prevent the cone from sliding before them as they travel around the cone D.

What I claim, and desire to secure by Letters Patent, is—

1. The combination and arrangement of the frame B, rollers C C C C, and gearing E E E E, with the cone D, gearing F, bolt G, and spring J, when constructed and operated substantially as and for the purposes set forth.

2. The trough N, with aperture O, when constructed as and for the purposes set forth.

THOMAS E. HUNT.

Witnesses:
 HORATIO C. NEWCOMB,
 JOHN H. REDSTONE.